March 26, 1940.  J. N. SMITH ET AL  2,195,125
MULTILOOP V BELT
Filed July 23, 1938  4 Sheets-Sheet 1
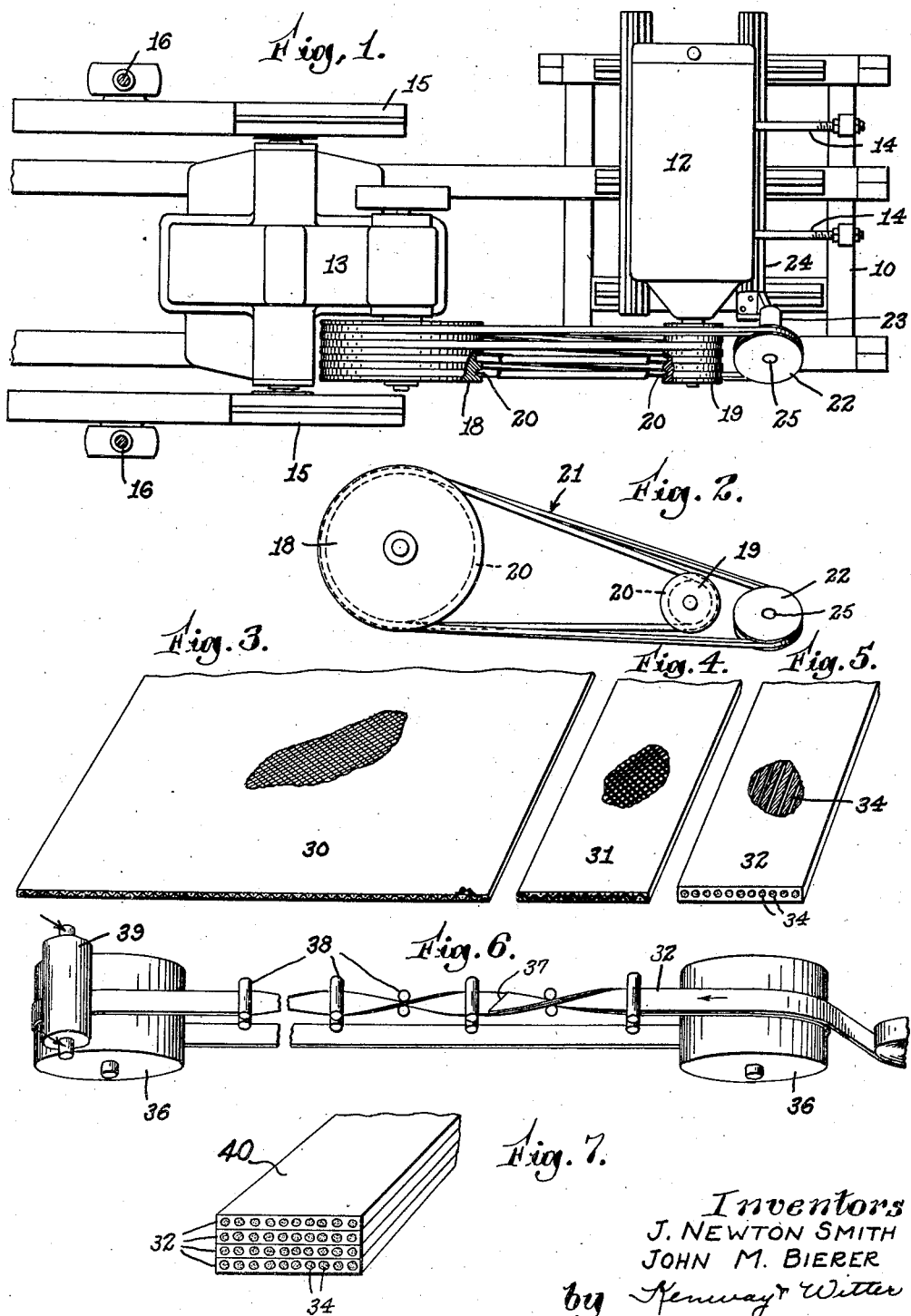
Inventors
J. NEWTON SMITH
JOHN M. BIERER
by Kenway & Witter
Attorneys

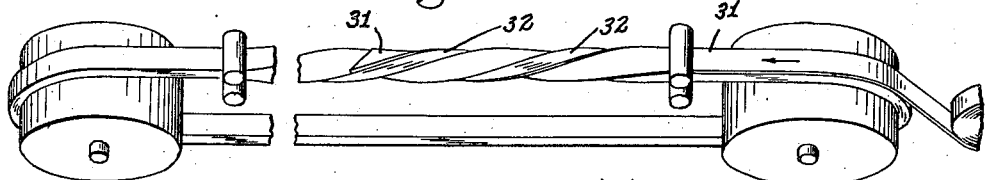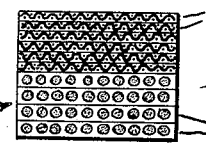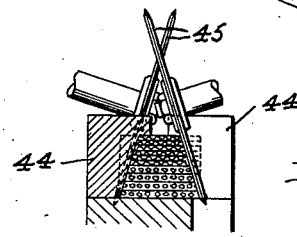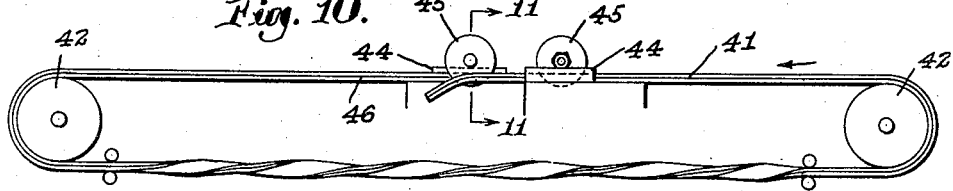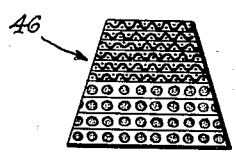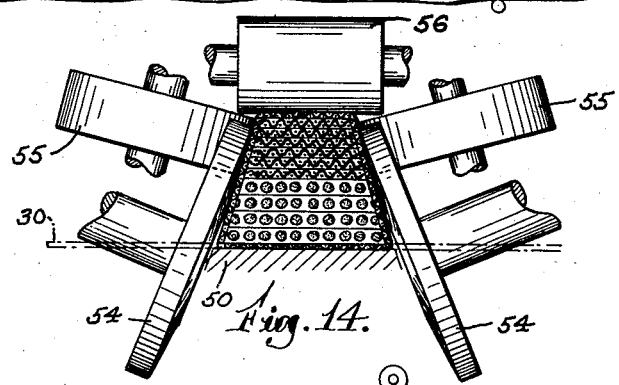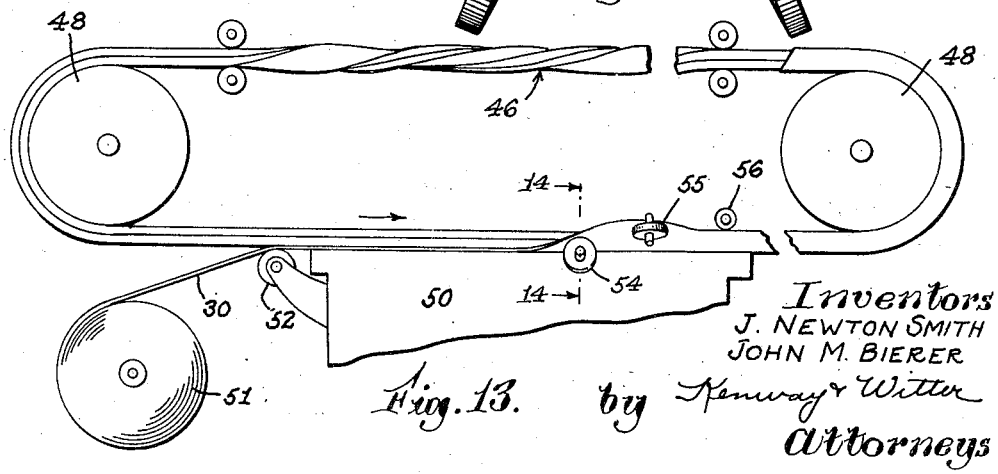

March 26, 1940.    J. N. SMITH ET AL    2,195,125
MULTILOOP V BELT
Filed July 23, 1938    4 Sheets-Sheet 3
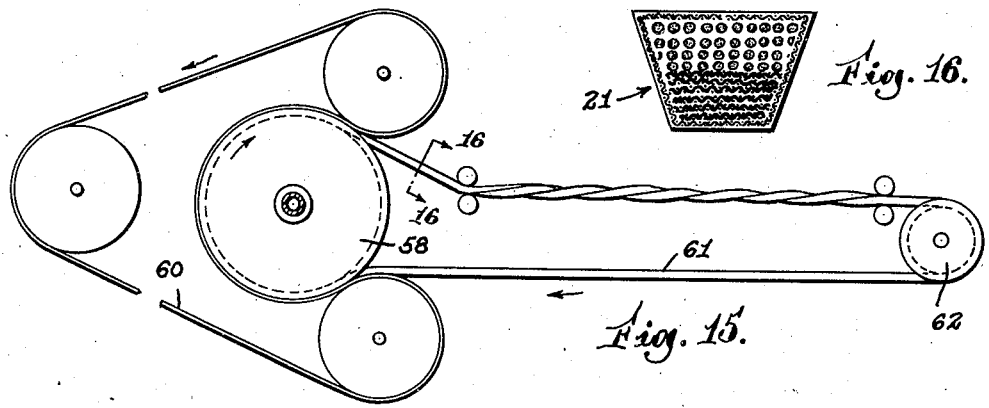
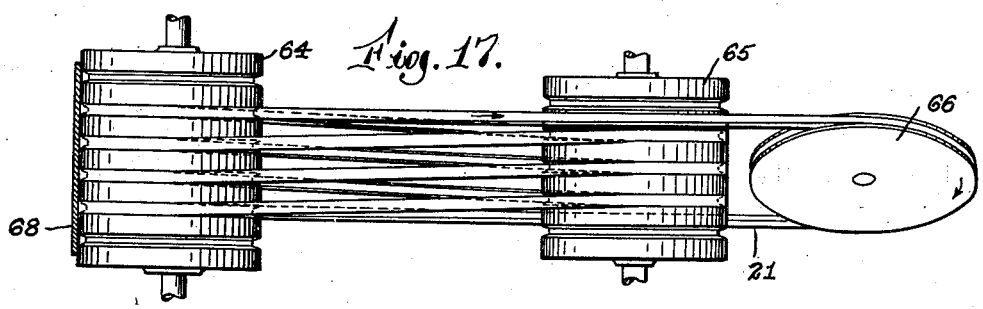
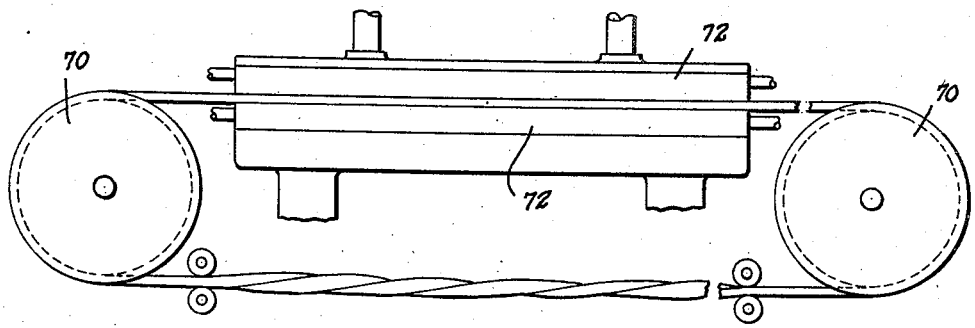
Inventors
J. NEWTON SMITH
JOHN M. BIERER
by Kenway & Witter
Attorneys March 26, 1940.     J. N. SMITH ET AL     2,195,125
MULTILOOP V BELT
Filed July 23, 1938     4 Sheets-Sheet 4

Inventors
J. NEWTON SMITH
JOHN M. BIERER
by Kenway & Witter
Attorneys

Patented Mar. 26, 1940

2,195,125

UNITED STATES PATENT OFFICE 2,195,125

MULTILOOP V BELT

Joseph Newton Smith, Salem, and John M. Bierer, Waban, Mass., assignors to Boston Woven Hose & Rubber Company, Cambridge, Mass., a corporation of Massachusetts Application July 23, 1938, Serial No. 220,884

3 Claims. (Cl. 74—233)

This invention relates to multiloop V belts and multiloop V belt driving mechanism, and the primary object of the invention resides in the development of a novel system of power transmission which combines the advantages of the continuous rope driving system and the multiple V belt driving system and at the same time eliminates most of the disadvantages present in these two old and well known systems.

The continuous rope driving system of power transmission, employing an endless rope looped into a plurality of double reaches, has been known for many years and, while such system has certain advantages, its disadvantages are numerous and include (1) the requirement of large diameter sheaves to carry the load; (2) tendency of the rope to stretch; and (3) serious effect of atmospheric conditions on the rope and its driving efficiency. V belts, including multiple V belts, have many advantages over rope drives, including (1) high coefficient of contact friction due to wedging action; (2) high contact friction over a wide range of belt tensions since the wedging action is not entirely dependent on belt tension; (3) efficiency in transmitting under conditions of small arcs of contact and relatively close sheave centers; (4) less exacting requirements in respect to shafting alignment than in the case of flat belts; (5) quiet operation. Together with such advantages, however, multiple V belts as heretofore constructed and operated have had serious disadvantages, including the requirements (1) that all belts of a set shall be exactly equal in length, cross sectional area, and tension modulus; (2) that unequal distribution of the load causes certain of the belts to fail due to overloading; (3) that any individual belt replacement usually requires replacement of the entire set. Summarized, the load carrying efficiency of multiple V belts depends on uniform length, size, and tensile modulus, and the fulfilling of such exacting requirements is a manufacturing impossibility.

Our improved V belt system contemplates the employment of an endless V belt so constructed that it can be looped into a plurality of double reaches united by loops at their ends and having the V faces of each reach extending straight from each loop to an oppositely disposed loop whereby the several reaches and loops provide in effect a plurality of V belts adapted to engage grooved sheaves after the manner of known multiple V belts. As is hereinafter more specifically described, this improved belt is constructed with one or more 360° transverse twists therein permitting it to be looped in the manner above stated and run continuously with its V faces in proper contacting engagement with the said sheaves, the belt being adapted to have one loop thereof carried across the reaches from one outside reach to the other outside reach by suitable means.

Our improved multiloop V belt system embodies all the above enumerated advantages of the multiple V belt system as well as the advantages of the continuous rope driving system and without having the serious disadvantages enumerated. Among the advantages of our novel belt may be mentioned (1) elimination of the exacting requirements of the multiple V belt system and retaining of the primary advantage of the continuous rope drive system that every reach of the belt automatically takes an equal share of the load; (2) uniform load throughout the load carrying portions of the belt causes the belt to wear uniformly whereby replacement is required only when the entire belt becomes worn out, the expense of frequent replacement due to partial failures being thereby eliminated; (3) elimination of the necessity to match belts as is required when using multiple V belts; (4) uniform tension on the entire load carrying portions of the belt is obtained by a single take-up idler acting on the return or cross-over loop.

The production of a novel multiloop V belt and multiloop V belt driving mechanism of the nature above and hereinafter described comprises the primary object of our invention.

The above defined and other features of the invention will be best understood and appreciated from the following description of preferred embodiments thereof, selected for purposes of illustration and shown in the accompanying drawings in which Fig. 1 is a plan view of a V belt driving unit employing our invention.

Fig. 2 is a side elevation of the driving belt and sheaves.

Figs. 3, 4 and 5 are views showing respectively the strip material usually employed in the cover, compression portion and tension portion of the belt.

Fig. 6 is a somewhat diagrammatic view in perspective showing the step of forming the tension portion of the belt.

Fig. 7 is an enlarged cross sectional view through the formed tension portion of the belt.

Fig. 8 is a view similar to Fig. 6 and showing the step of building the compression portion of the belt onto the tension portion thereof.

Fig. 9 is an enlarged cross sectional view through the belt body which comprises the combined tension and compression portions.

Fig. 10 is a somewhat diagrammatic view in side elevation showing the shearing of the belt body to V form.

Fig. 11 is an enlarged sectional view taken on line 11—11 of Fig. 10.

Fig. 12 is a cross sectional view through the sheared belt body.

Fig. 13 is a somewhat diagrammatic view in side elevation showing the applying of the belt cover to the belt body.

Fig. 14 is an enlarged view taken on line 14—14 of Fig. 13.

Fig. 15 is a somewhat diagrammatic view in side elevation showing the continuous vulcanizing of the covered belt.

Fig. 16 is an enlarged sectional view of the completed belt taken on line 16—16 of Fig. 15.

Fig. 17 is a somewhat diagrammatic plan view showing a modified method of continuously vulcanizing the belt.

Fig. 18 is a view in side elevation showing the vulcanizing of the belt in a flat press.

Figure 19:
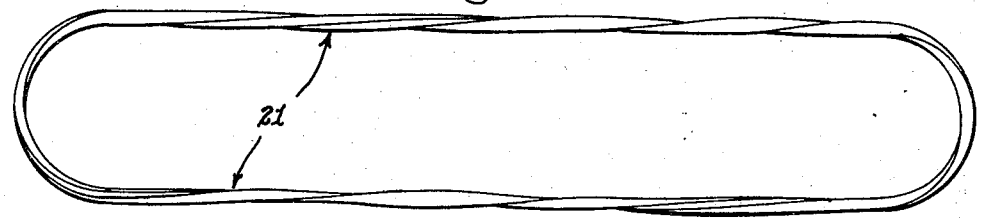
Fig. 19 is a view of the completed belt in side elevation.

In Fig. 1, we have illustrated a power driving mechanism employing our novel multiloop V belt. This mechanism comprises a base 10 on which is mounted a driving unit or motor 12 and a driven unit 13, the motor being adjustable toward and from the unit 13 under the action of threaded rods 14 and the unit 13 carrying crank arms 15 connected by rods 16 to mechanism to be oscillated or reciprocated. The units 12 and 13 are provided with sheaves 18 and 19 formed with annular V grooves 20 therein for receiving the V belt.

The belt 21 is one endless piece looped into four double reaches united by loops at their ends. The four loops at one end of the reaches are engaged within the four annular grooves 20 in the sheave 18 and three of the loops at the opposite end of the reaches are engaged within three annular grooves 20 in the sheave 19. The remaining loop extends beyond the sheave 19 and is supported on a sheave 22 carried on a bracket 23 secured to the frame 24 which carries the motor. The sheave 22 is mounted to rotate on an axis 25 disposed at an angle to the rotary axis of the sheave 19, and the sheave 22 is of such size as to hold its belt reaches clear of the sheave 19. The sheave 22 may be termed the cross-over sheave since its purpose is to carry the belt from the outside groove at one side of the sheave 18 to the outside groove at the other side thereof.

Figure 20:
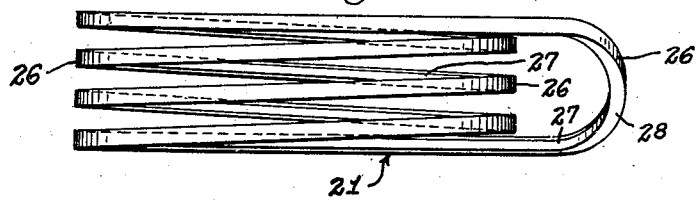
Fig. 20 is a plan view of the completed belt in the form it assumes on the driving unit shown in Fig. 1.

In Fig. 19 we have shown the belt 21 in the condition or shape which it normally assumes and in Fig. 20 we have shown it looped to its useful configuration. Whereas the known V belt has a pair of reaches connected by sheave-engaging loops at their ends, our novel V belt in use has a plurality of pairs of such reaches, the belt 21 having four pairs thereof. As illustrated in Fig. 1, the reaches pass to and from sheaves within the grooves of which the belt engages. As illustrated in Fig. 20, the outer face 26 of the belt faces outwardly throughout the reaches and loops and the belt has two endless V faces 27 converging inwardly from said outer face whereby the said V faces are adapted continuously to run straight through the sheaves and engage the V grooves thereof in the same manner as the known V belts.

We have discovered that a V belt can be looped to provide a plurality of pairs of reaches and still leave the outer face 26 facing outwardly throughout the reaches and loops and the V faces converging inwardly therefrom by placing one or more 360° transverse twists in the belt. The number of such twists corresponds to the number of additional pairs of reaches to be provided. For example, if the belt is to have one additional pair of reaches, a total of two pairs of reaches, the belt will be given one 360° transverse twist. The belt 21 has three additional pairs of reaches and it is therefore provided with three 360° transverse twists as shown in Fig. 19. Such twists cause the belt properly to engage the sheave grooves and run straight therethrough after the manner of known V belts. The cross-over, illustrated by the loop 28 in Fig. 20, can be effected by any of various known methods and mechanisms.

Our novel V belt can be made by various methods certain of which are illustrated herein. In all of such methods, however, the belt will be given one or more 360° transverse twists and, while the belt might possibly be constructed in such manner that the twist is given thereto as a whole, i. e., the belting being provided or constructed in end form and the ends being joined together to form an endless belt after the belting piece as a whole has been given the proper number of twists, we prefer to construct the same in endless form and apply the twist thereto during the building up of the belt whereby to produce an endless belt of uniform construction therealong throughout its length, all as hereinafter described.

A V belt includes a body having an inner compression portion and an outer tension portion, and this body is enclosed within a suitable cover. In Figs. 3, 4 and 5 we have shown respectively the strip material employed in the cover, compression portion and tension portion of the belt. The cover strip 30 comprises one or more plies of light duck cut on the bias and compressed to secure the necessary adhesion. The compression strip 31 is rubberized fabric cut on the bias, and the tension strip 32 embodies cords 34 embedded within a rubber binder. In the preferred method of construction, the strips 31 and 32 are plied up in endless form to give the necessary strength and provide the belt body, after which the cover strip is applied, the 360° twists being given to the strips as they are applied.

In Fig. 6, we have illustrated the forming of the tension portion of the belt. The strip 32 is looped over two supporting rolls 36 to form an endless band having the strip end 37 fixed thereto adhesively or in any suitable manner and, as illustrated in Fig. 6, the upper reach of the belt passes through a plurality of pairs of guiding rolls 38. While we have illustrated the relatively angular position of these rolls as being 180° successively along the upper reach, it will be understood that any number of rolls arranged at suitable angles and on one or both reaches may be provided. The rolls 38 guide the band as the same is built up from the strip 32 and give the necessary 360° transverse twists thereto. When the band has been built up to the desired strength, the trailing end of the strip is attached thereto and the compression portion is applied by winding thereonto in like manner the strip 31, as illustrated in Fig. 8. The strips are all of an adhesive nature and during the plying up of the strips 31 and 32 they will be suitably pressed into contact by any convenient means, such as rollers 39 or a flexible pressure band cooperating with one or both rolls 36, other adhesive or cement being applied to the plies as may appear necessary or desirable.

The tension band 40 is shown in cross section in Fig. 7 and the combined tension and compression bands are shown in Fig. 9. As thus far described and illustrated, the body portion 41 is rectangular in cross section and we prefer next to give the body a V shape preferably by shearing away side portions thereof. This step is illustrated in Figs. 10 and 11 wherein the band is shown as supported on two rolls 42 with the twist in the lower reach and having the upper reach thereof passing straight through guides 44 and rotary shearing knives 45. It will be apparent that as the band is driven in the direction of the arrow, the knives will shear the side edges to the V shape illustrated in Fig. 12. The resulting band 46 is now ready to receive the belt cover.

In Fig. 13, the band 46 is shown as supported on two rolls 48 with the twist in the upper reach and having the lower reach passing straight across a platform 50. As the band travels in the direction of the arrow the cover strip 30 is drawn therewith from a roll 51 over a guiding roll 52. Two pairs of rolls 54 and 55 thereupon act upon the cover to wrap it about and press it onto the V sides of the band, and a roller 56 serves to press the two edges of the cover into firm adhesive contact with the inner face of the band, as is best illustrated in Fig. 14. The belt in the form illustrated in Fig. 14 is now ready to be vulcanized.

The belt can be vulcanized by any convenient and suitable method, either continuously as illustrated in Figs. 15 and 17 or in steps as illustrated in Fig. 18. The method illustrated in Fig. 15 embodies the use of a heated vulcanizing drum 58 V-grooved annularly to receive one or more belts and having a pressure band 60 passing around a substantial arcuate portion thereof in the manner illustrated and described in Patent No. 2,083,527. The endless belt 61 to be vulcanized is supported on the drum and an outer roll 62 with the twists in the upper reach whereby leaving the lower reach running straight from the roll 62 to the drum. The drum is rotated slowly in the direction of the arrow whereupon the belt is run into the V groove thereof and pressed firmly thereinto by the pressure band 60. The belt is thereby continuously vulcanized during its contact passage with the drum beneath the pressure band. It will be understood that a plurality of belts may be thus vulcanized simultaneously on the drum. The completed belt is illustrated in cross section in Fig. 16.

It is also possible to vulcanize the belt while holding it in the looped form in which it is used. This method is illustrated in Fig. 17 wherein the belt is supported on two drums 64 and 65 and a cross-over sheave 66. The drums and sheaves are V-grooved annularly to receive the belt and the vulcanizing may be performed where the belt engages either drum or where it engages the sheave. A pressure band, such as is shown at 68, will preferably be provided to cooperate with the belt and force it into the vulcanizing groove or grooves.

The belt may be vulcanized in successive steps on a flat press as illustrated in Fig. 18. In this case the belt is supported on rolls 70 with the twist in the lower reach. The top reach of the belt runs straight between the two rolls and a flat press 72 is adapted to engage and vulcanize this straight portion. When one portion of the belt has been vulcanized, the belt is moved along to bring the adjacent unvulcanized portion thereof to the press in the usual and well known manner.

The completed belt is shown in its normal condition in Fig. 19 and in the form it assumes on the driving unit in Fig. 20. The novel method of making V belts disclosed is not claimed herein, but forms the subject matter of our copending application, Ser. No. 234,004, filed October 8, 1938.

Figure 21:
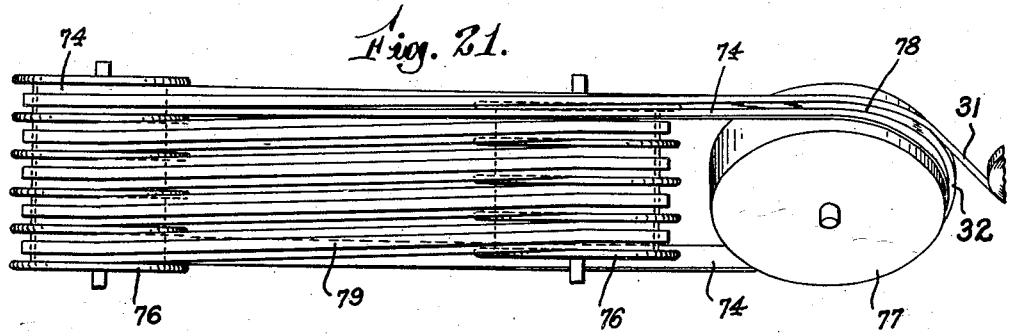
Fig. 21 is a somewhat diagrammatic view showing a modified method of constructing the belt.

A modified method of making the belt in looped condition is illustrated in Fig. 21. In this case an endless work-supporting band 74 passes in a plurality of reaches and loops over two supporting drums 76 and over a cross-over roll 77, the band 74 being a permanent part of the apparatus. The tension and compression strips 31 and 32 are applied to this band at 78 and plied up thereon in like manner as illustrated in Figs. 6 and 8 to provide an endless belt body 79 like that illustrated in Figs. 8 and 9. This body can then be sheared to the V form, covered and vulcanized as heretofore described or it can be covered without shearing, to the form illustrated in cross section in Fig. 23, and thereafter compressed to V shape during the vulcanizing treatment, as illustrated in Figs. 22 and 24.

Figures 22, 23, 24:
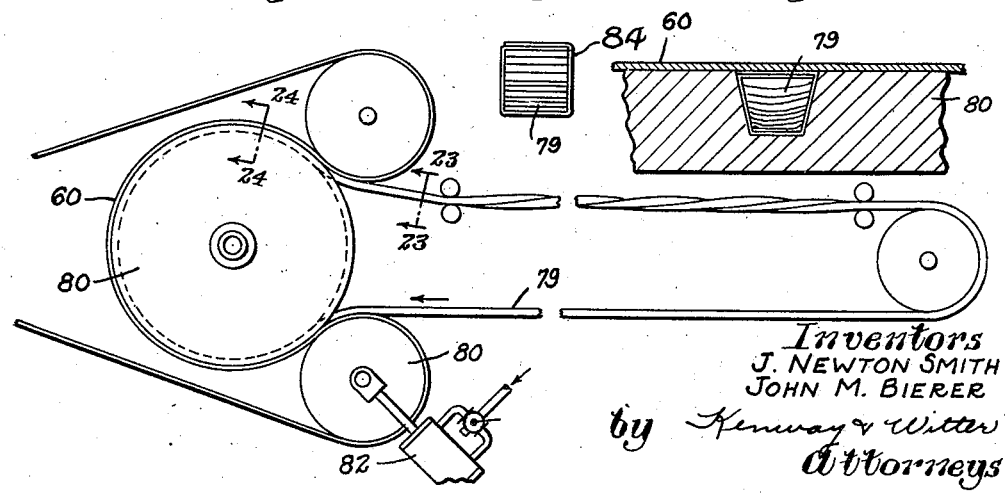
Fig. 22 is a somewhat diagrammatic view showing the continuous shaping and vulcanizing of the belt to V form.
Fig. 23 is an enlarged cross sectional view of the belt before being shaped and vulcanized, this view being taken on line 23—23 of Fig. 22.
Fig. 24 is a fragmentary sectional view taken on line 24—24 of Fig. 22.

The apparatus used in such treatment may be substantially the same as that illustrated in Fig. 15 and heretofore described, the band supporting roller 80 together with the pressure band 60 serving to force the belt body 79 into the V groove and mold it to the V shape shown in Fig. 24. To serve this function the roller 80 can be pressure operated through the use of hydraulic cylinders 82 in like manner as in Patent No. 2,093,904. The belt body is vulcanized during its contact passage with the drum beneath the pressure band 60.

It may also be stated that the covered belt shown in Fig. 23 may be made after the fashion illustrated in Fig. 21 by first laying the cover 84 in flat form on the band 74 and then building the belt body thereonto, the edge portions of the cover being thereafter wrapped about the belt body.

Having thus described our invention what we claim as new and desire to declare by Letters Patent is:

1. An endless V belt having a body constructed of strip material wrapped longitudinally of the belt into a plurality of plies bound together into an endless unit, the plies and unit having one or more 360° transverse twists therein and each ply strip being longer than the belt.

2. An endless V belt having an endless body comprising an inner compression portion and an outer tension portion, said portions each comprising a single strip of material longer than the belt and wrapped longitudinally of the belt into a plurality of plies and the plies of both portions being bound together into an endless unit and having one or more 360° transverse twists therein.

3. An endless V belt having an endless body constructed of strip material wrapped longitudinally of the belt into a plurality of plies bound together into an endless unit, the outer plies being of high tensile strength and forming a tension portion and the inner plies being compressible and forming a compression portion and each ply strip being longer than the belt, and a cover strip wrapped longitudinally and transversely into covering contact with the body, the said plies and cover strip having one or more 360° transverse twists therein and being vulcanized into a unit.

J. NEWTON SMITH.
JOHN M. BIERER.